United States Patent [19]
Hug et al.

[11] Patent Number: 5,628,968
[45] Date of Patent: May 13, 1997

[54] APPARATUS FOR PURIFYING POLLUTANT-CONTAINING WASTE AIR FROM INDUSTRIAL PLANTS BY REGENERATIVE AFTERBURNING

[75] Inventors: Joachim Hug, Sindelfingen; Apostolus Katefidis, Gärtringen, both of Germany

[73] Assignee: Eisenmann Maschinenbau KG, Böblingen, Germany

[21] Appl. No.: 245,750

[22] Filed: May 18, 1994

[30] Foreign Application Priority Data

Dec. 27, 1993 [DE] Germany .......................... 43 44 700.7

[51] Int. Cl.⁶ .................. F01N 3/10; B01J 23/90; F23B 5/00
[52] U.S. Cl. ............ 422/173; 422/175; 422/198; 422/206; 422/223; 422/236; 422/239; 110/212; 165/168
[58] Field of Search .................. 422/173, 175, 422/198, 206, 223, 239, 236; 110/212; 165/168, 904, 907

[56] References Cited

U.S. PATENT DOCUMENTS

| | | | |
|---|---|---|---|
| 3,718,440 | 2/1973 | Foster-Pegg | 422/173 |
| 3,895,917 | 7/1975 | Ravault | 422/169 |
| 4,017,347 | 4/1977 | Cleveland | 156/89 |
| 4,126,419 | 11/1978 | Katabuchi et al. | 422/109 |
| 4,303,125 | 12/1981 | Vahlbrauk | 165/168 |
| 4,308,233 | 12/1981 | Narumiya et al. | 422/169 |
| 4,744,216 | 5/1988 | Rao et al. | 60/303 |
| 4,764,345 | 8/1988 | Koch | 422/146 |
| 4,793,974 | 12/1988 | Hebrank | 422/175 |
| 4,901,654 | 2/1990 | Albertson et al. | 110/346 |
| 5,016,547 | 5/1991 | Thomason | 110/211 |
| 5,322,116 | 6/1994 | Galloway et al. | 165/133 |

FOREIGN PATENT DOCUMENTS

| | | |
|---|---|---|
| 3811598 | 10/1989 | Germany . |
| 3821126 | 12/1989 | Germany . |
| 4142136 | 7/1993 | Germany . |

Primary Examiner—Nina Bhat
Attorney, Agent, or Firm—Friedrich Kueffner

[57] ABSTRACT

An apparatus for purifying pollutant-containing waste or exhaust air from industrial plants by means of regenerative afterburning includes a heat exchanger in the form of a heat exchanger fill. The material for the heat exchanger fill is a sponge-like foamed ceramic material having open pores. In accordance with another embodiment, the material of the heat exchanger fill may be constituted by ceramic grate plates or grate bodies.

8 Claims, 1 Drawing Sheet

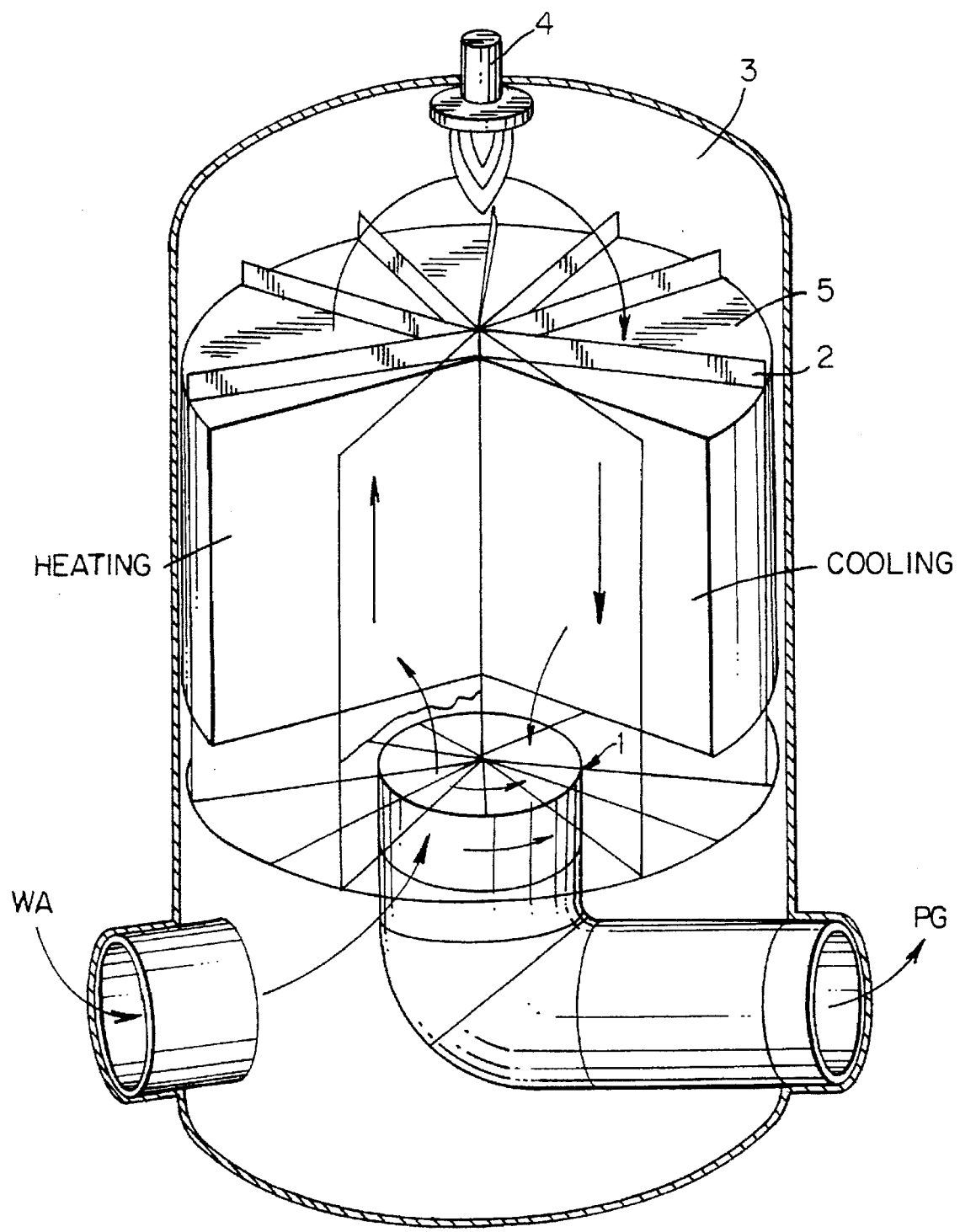

APPARATUS FOR PURIFYING POLLUTANT-CONTAINING WASTE AIR FROM INDUSTRIAL PLANTS BY REGENERATIVE AFTERBURNING

BACKGROUND OF THE INVENTION

1. Field of the Invention

The present invention relates to an apparatus for purifying pollutant-containing waste or exhaust air from industrial plants by means of regenerative afterburning.

2. Description of the Related Art

Systems of the above-described type have been known in the art for a long time in a large variety of embodiments, for example, as disclosed in DE-OS 38 11 598 and DE-OS 38 21 126.

The known systems mentioned above have the disadvantage that relatively complicated and expensive structures are required for carrying out the necessary circulation of the respective heat exchanger fill. Accordingly, in a consistent continuation of the technical development, an apparatus has been disclosed in DE-OS 41 42 136 in which the pollutant-containing waste air and the purified gas produced by regenerative afterburning are conducted by means of a rotary valve in a controlled manner through a heat exchanger fill which is arranged in a segment-like manner above the rotary valve, wherein the heat exchanger fill is not subject to regulation or control and is composed of shaped pieces of stoneware or ceramic material, such as, saddle-shaped pieces, ring-shaped pieces or cylindrical ring-shaped pieces.

SUMMARY OF THE INVENTION

In view of the continuously rising requirements with respect to the environmental compatibility of industrial plants and the required reduction of the burden on the environment, it is the primary object of the present invention to further reduce the structural requirements for an apparatus of this type and, in addition, to increase the heat recovery and the purification effect.

In accordance with the present invention, the material for the heat exchanger fill is a sponge-like foamed ceramic material having open pores. In accordance with another embodiment, the material of the heat exchanger fill may be constituted by ceramic grate plates or grate bodies.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

The single FIGURE of the drawing is a partially sectional, perspective view of an apparatus according to the present invention.

DETAILED DESCRIPTION OF THE PREFERRED EMBODIMENTS

The FIGURE of the drawing shows an apparatus for purifying pollutant-containing waste air from industrial plants by means of regenerative afterburning constructed essentially as disclosed in DE-OS 41 42 136.

The pollutant-containing waste air WA is introduced into the apparatus and conducted through the rotary valve 1 and upwardly in segments within the apparatus formed by separating walls 2. The waste air is heated by heat exchanges fills 5 as it flows upwardly and then reaches a reaction chamber 3. A burner 4 is provided in the reaction chamber 3. The burner 4 heats the heat exchanger fills 5 if the temperature of the heat exchanger fills 5 is below the ignition point of the pollutants contained in the waste air. The air then flows through the heat exchange fills 5 and is cooled as it flows downwardly to the rotary valve 1. The purified gas PG is conducted outwardly from the rotary valve 1. The heat exchanger fills 5 are arranged in the segments between the separating walls 2.

In accordance with the present invention, the heat exchanger fills are composed of a sponge-like foamed ceramic material having open pores. Ceramic grate plates or grate bodies can also be used as the heat exchanger material.

Depending on the size of the apparatus and the type of pollutant-containing waste air, it may be advantageous if the material intended for the heat exchanger fills out in one piece each space between two vertically extending separating walls 2 arranged in the heat exchanger area of the reactor. On the other hand, the material intended for the heat exchanger may be composed of several partial pieces which are stacked in a defined manner immediately next to one another and one above the other.

In accordance with a further advantageous development, in order to improve the filtering effect and for effecting the rinsing or purifying cycle, the material intended for the heat exchanger may have larger pores on the side where the waste air WA enters. If the heat exchanger material is in the form of grates, the grate spacing of the heat exchanger material becomes smaller continuously or in a step-like manner from the side of the entry of the waste air WA toward the direction of the reaction chamber.

The apparatus for purifying pollutant-containing waste air from industrial plants equipped with heat exchanger material according to the present invention provides the following advantages: The volume of the reactor is substantially reduced in relation to the throughput quantity of waste air. The thermodynamic conditions are improved. The structure becomes technically less complicated and less expensive. Also, the highest possible internal heat recovery is possible. The heat transfer efficiency is very high and the rinsing and purifying conditions are improved.

The invention is not limited by the embodiments described above which are presented as examples only but can be modified in various ways within the scope of protection defined by the appended patent claims.

We claim:

1. An apparatus for purifying pollutant-containing waste air from industrial plants by regenerative afterburning, the apparatus comprising a reactor with a waste air inlet and a purified gas outlet, a rotary valve for controlling flow of the waste air through the waste air inlet into the reactor and for controlling flow of the purified gas through the purified gas outlet from the reactor, the reactor further comprising a reaction chamber and a heat exchanger arranged between the rotary valve and the reaction chamber, a burner mounted in the reaction chamber for heating the heat exchanger, means for conducting the waste air from the waste air inlet through the heat exchanger to the reaction chamber and for conducting purified gas from the reaction chamber through the heat exchanger to the purified gas outlet, wherein the heat exchanger is of a foamed ceramic material having open pores, and wherein the pores of the ceramic material have pore sizes, wherein the pore sizes are larger adjacent the waste air inlet.

2. The apparatus according to claim 1, wherein the reactor comprises a plurality of vertically extending separating walls, the heat exchanger material being arranged in a single piece in each space between the separating walls.

3. The apparatus according to claim 1, wherein the reactor comprises a plurality of vertically extending separating walls, the heat exchanger material being arranged in spaces between the separating walls in the form of a plurality of partial pieces stacked in a defined manner immediately next to one another and above one another.

4. An apparatus for purifying pollutant-containing waste air from industrial plants by regenerative afterburning, the apparatus comprising a reactor with a waste air inlet and a purified gas outlet, a rotary valve for controlling flow of the waste air through the waste air inlet into the reactor and for controlling flow of the purified gas through the purified gas outlet from the reactor, the reactor further comprising a reaction chamber and a heat exchanger arranged between the rotary valve and the reaction chamber, a burner mounted in the reaction chamber for heating the heat exchanger, means for conducting the waste air from the waste air inlet through the heat exchanger to the reaction chamber and for conducting purified gas from the reaction through the heat exchanger to the purified gas outlet, wherein the heat exchanger is comprised of ceramic grates in the form of grate plates or grate bodies, and wherein the grate-like heat exchanger material has a grate spacing, and wherein the grate spacing becomes smaller in a direction from the waste air inlet toward the reaction chamber.

5. The apparatus according to claim 4, wherein the reactor comprises a plurality of vertically extending separating walls, the heat exchanger material being arranged in a single piece in each space between the separating walls.

6. The apparatus according to claim 4, wherein the reactor comprises a plurality of vertically extending separating walls, the heat exchanger material being arranged in spaces between the separating walls in the form of a plurality of partial pieces stacked in a defined manner immediately next to one another and above one another.

7. The apparatus according to claim 4, wherein the grate spacing becomes smaller in a continuous manner.

8. The apparatus according to claim 4, wherein the grate spacing becomes smaller in a step manner.

* * * * *